United States Patent [19]

Sugitani et al.

[11] Patent Number: 4,851,638
[45] Date of Patent: Jul. 25, 1989

[54] BEVEL PROFILING CONTROL METHOD FOR ARC WELDING

[75] Inventors: Yuji Sugitani; Masatoshi Murayama, both of Tsu, Japan

[73] Assignee: Nippon Kokan Kabushiki Kaisha, Tokyo, Japan

[21] Appl. No.: 147,742

[22] Filed: Jan. 25, 1988

[30] Foreign Application Priority Data

Jan. 26, 1987 [JP] Japan .................................. 62-14169

[51] Int. Cl.$^4$ .............................................. B23K 9/12
[52] U.S. Cl. ........................... 219/124.34; 219/125.12
[58] Field of Search ..................... 219/124.34, 124.22, 219/125.12

[56] References Cited

U.S. PATENT DOCUMENTS

| 4,419,563 | 12/1983 | Nomura et al. | 219/125.12 |
| 4,704,513 | 11/1987 | Sugitani et al. | 219/124.34 |

FOREIGN PATENT DOCUMENTS 1540939 1/1979 Fed. Rep. of Germany .
54-19445 2/1979 Japan .
54-26261 2/1979 Japan .
55-45577 3/1980 Japan .
55-133871 10/1980 Japan .
57-91877 6/1982 Japan .
58-112660 5/1983 Japan .
1136595 12/1968 United Kingdom .

*Primary Examiner*—Clifford C. Shaw
*Attorney, Agent, or Firm*—Michael N. Meller

[57] ABSTRACT

There is disclosed a method for arc welding wherein an electrode wire is rotated to produce an arc rotating at an elevated speed and wherein the arc produced in this manner is used as an arc sensor for making a bevel profiling. According to the invention, the rotational speed of the arc N is set so as to be larger than a constant speed as determined by the time constant of the change of the wire melting speed so that the difference between the welding current when the electrode wire is at the center of the bevel and that when the electrode wire is at the extreme lateral position is increased to improve the bevel profing performance.

1 Claim, 3 Drawing Sheets

BEVEL PROFILING CONTROL METHOD FOR ARC WELDING

BACKGROUND OF THE INVENTION

1. Field of the Invention

This invention relates to a method for arc welding aimed at improving the bevel profiling performance by an arc rotating at an elevated speed.

2. Description of the Prior Art

The method for arc welding wherein an electrode wire is revolved to cause an arc to be rotated at an elevated speed to effect welding is known, for example, from the Japanese Laid-Open Patent Publication No. 133871/1980. This welding method may be advantageously applied to narrow bevel welding or to fillet welding since the physical effect such as the arc force or heat may be uniformly distributed around the welding pond due to the high speed arc rotation to promote the curvature or smoothing of the weld bead or penetration into surrounding portions.

Furthermore, as disclosed in the Japanese Laid-Open Patent Publication No. 91877/1982, the above method for arc welding may be adapted to automatic bevel profiling with high response characteristics since the arc voltage or current waveform produced during the high speed rotation of the arc may be separately integrated at the left and right sides in the proceeding direction of welding and the offset voltage thus obtained may be directly used as the input to the driving electric motor to effect servo drive or control. In this manner, in addition to the above described advantage in connection with the formation of weld beads, there is obtained an additional advantage that the electrode terminal position can be set with high precision during welding.

On the other hand, the so-called arc sensor system in which the current or voltage waveform of the welding arc is used as the bevel profiling sensor, is also well-known not only in connection with the above described method for arc welding in which the arc is rotated at an elevated speed, but also in connection with a welding method in which the electrode is linearly reciprocated along the width of the bevel, as disclosed, for example, in the Japanese Laid-Open Patent Publications Nos. 19445/1979 or 26261/1979.

In the above arc sensor system, the higher the rotational speed or the speed of oscillation, both expressed in Hz, of the arc, indicating the number of revolutions or the number of times of oscillations of the arc per unit time (second), the more excellent the detection or control capability of the arc sensor.

However, in the welding method of the aforementioned linear oscillation system, the speed of arc oscillation cannot be elevated excessively because of mechanical constraint, so that a practical limit is set to about 5 Hz. Thus a limit is set to the resolution as the arc sensor, such that it is difficult to improve the control accuracy and detection capability further.

With the welding method in which an arc is rotated at an elevated speed, a rotational speed of the order of 100 Hz, for example, can be produced easily to improve the detection and control capability of the arc sensor further so that the method is better than the welding method of the linear reciprocation system.

However, in the above welding method in which the arc rotated at an elevated speed is used for welding, when the rotational speed of the arc is lowered incidentally, a definite offset voltage cannot be obtained by separately integrating the arc voltage or current waveform on the left and right sides relative to the proceeding direction of welding. The result is that the effect of the noise presents itself so pronouncedly that it is not possible to satisfactorily exhibit the effect of the arc sensor.

SUMMARY OF THE INVENTION

It is therefore a principal object of the present invention to obviate the above described drawbacks in the prior art welding method making use of the arc rotating at an elevated speed and to provide a method for arc welding wherein the lower limit of the rotational speed of the arc for which the effect of the arc sensor may be exhibited satisfactorily is definitely set to improve the performance of bevel profiling.

In view of this object, the present invention provides a method for arc welding in which an electrode wire is rotated at an elevated speed to effect high speed rotation of the arc, wherein the rotational speed of the arc N(Hz) is set so at to be higher than the rotational speed $1/4\tau$ (Hz) determined by the time constant $\tau$ of the change of the wire melting speed obtained by the following equation, thereby to increase the difference between the welding current when the electrode wire is at the center of the bevel and that when it is at the extreme lateral position of the weld.

The equation for the time constant $\tau$ referred to above is $$\tau = \frac{1}{BI^2}\left(1 - \frac{\Delta L_f}{\Delta E_x}\right)$$

wherein I denotes the welding current, B a constant determined by the diameter and the material of the electrode wire, and $\Delta L_f/\Delta E_x$ a variation of the wire protruding length $L_f$ in the ultimate steady state with respect to the variation in the distance Ex between the tip and the base metal.

According to the present invention, the rotational speed of the arc (Hz) is set so as to be higher than a prescribed value to increase the difference between the welding current when the electrode wire is at the center of the bevel and that when it is at the extreme lateral position to increase further the detection and control capability of the arc sensor.

In addition, since the difference between the welding current when the electrode wire is at the center of the bevel and that when it is at the extreme lateral position is increased, bevel profiling may be performed without any adverse effect due to noise produced during welding.

The above and other objects, features and advantages of the invention will become clearer from the following description taken in conjunction with the accompanying drawings.

DETAILED DESCRIPTION OF THE PREFERRED EMBODIMENTS

Referring now to FIGS. 1 to 9, a preferred illustrative embodiment of the present invention will be explained in more detail.

Figure 1:
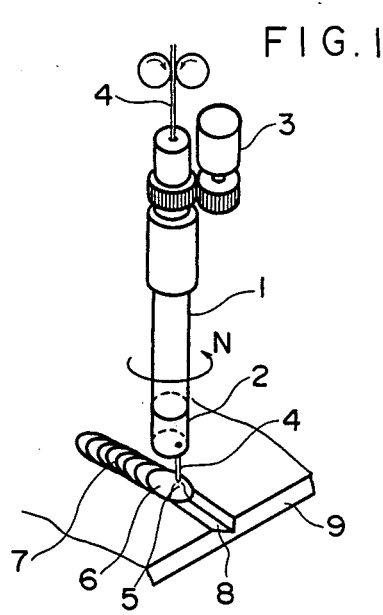
FIG. 1 is a perspective view showing the overall construction of a preferred embodiment of the present invention.

Referring first to FIG. 1, the numeral 1 denotes an electrode nozzle, the numeral 2 a current carrying tip secured to the foremost part of the nozzle 1, the numeral 3 an electric motor adapted for rotating the electrode nozzle 1 and the numeral 4 a welding wire supplied towards the center of the electrode nozzle 1 and offset by an offset opening, not shown, in the current carrying tip 2. The numeral 5 denotes an arc, the numeral 6 a weld pond, the numeral 7 a weld bead and the numeral 8 a center of a bevel formed in a base metal 9.

In the above described high speed rotation arc welding system, when the electrode nozzle 1 is revolved at an elevated speed in, for example, the direction indicated by the arrow labeled N, by the electric motor 3, the arc 5 at the foremost part of the welding wire 4 is revolved above the sole weld pond 6 along the circumference of a circle having a diameter corresponding to the offset amount of the offset opening in the current carrying tip 2.

The results of our analysis into the detection capability of the rotating arc 5 employed as the arc sensor will now be explained.

Figure 2:
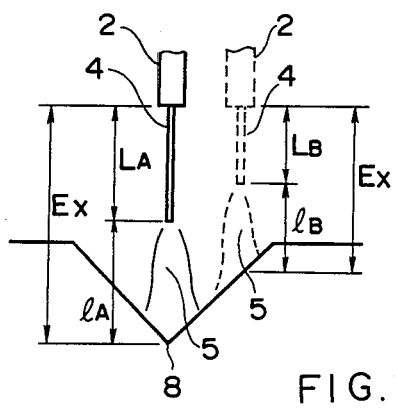
FIG. 2 is a side elevation showing the foremost part of electrode tip.
Figure 3:
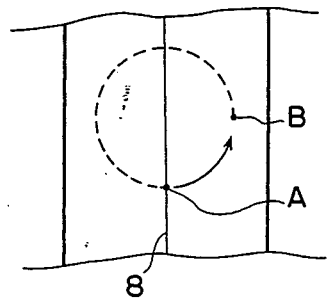
FIG. 3 is a plan view showing the position of a rotating arc.

FIG. 2 is a side view showing the foremost part of the current carrying tip 2, with the arc 5 being revolved. In the drawing, the arc 5 shown by the solid line indicates the arc being at a position A at the center of the bevel 8 as shown in FIG. 3, while the arc 5 shown by the broken line shows the arc after it has been turned and has reached a terminal or extreme lateral position B of the bevel which is 90° offset from the center of the bevel 8. In the drawing, the protruding length of the welding wire 4 when the arc 5 is at the position A at the center of the bevel 8 is denoted $L_A$, the arc length for this position is indicated by $l_A$, the welding current for this position is indicated by $I_A$, the protruding length of the welding wire 4 when the arc 5 has been revolved and reached the terminal position B of the bevel is indicated by $L_B$, the arc length for this position is indicated by $l_B$ and the welding current for this position is indicated by $I_B$. It will be seen that the distance Ex between the current carrying tip 2 and the base metal differs with the position of the arc 5, the arc lengths $l_A$ and $l_B$ thus being changed. When the arc length is changed, load characteristics are changed, the welding current I and the voltage E between the current carrying tip 2 and the base metal, hereafter referred to as the arc voltage, being thus changed.

Figure 4:
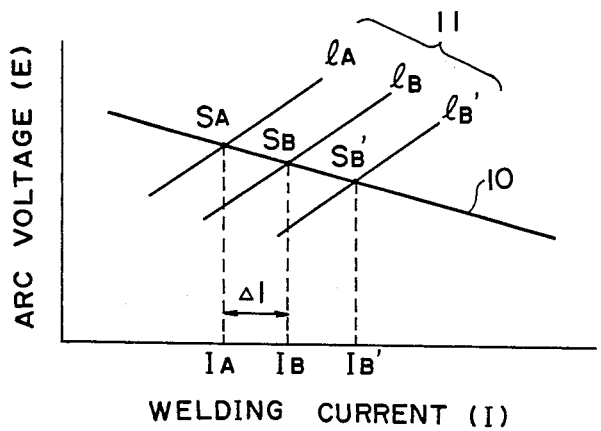
FIG. 4 is a diagram showing the changes in the welding current I and the arc voltage E, with the welding current I and the welding voltage E being taken on the abscissa and the coordinate, respectively.

In FIG. 4, characteristic changes in the welding current I and the arc voltage E as a function of changes in the arc length for the case in which the welding power source exhibits constant voltage characteristics are shown, with the welding current I and the arc voltage E being plotted on the abscissa and the ordinate, respectively. In the drawing, the numeral 10 denotes an external characteristic curve for the welding power source and 11 denotes load characteristic curves for the arc. The load characteristic curves 11 for the arc are changed as shown in the drawing as a function of the arc lengths $l_A$ and $l_B$ as shown in the drawing. These load characteristic curves 11 show the case wherein $l_A > l_B$.

The arc operating points are at the intersection of the external characteristic curve 10 with the load characteristic curves 11 of the respective arcs, with the arc length $l_B$ becoming shorter than the arc length $l_A$ when the arc 5 is at the terminal position B of the bevel, since the distance Ex between the current carrying tip 2 and the base metal then becomes less than that when the arc is at the center of the bevel A. Thus the arc operating point is also shifted from point $S_A$ to point $S_B$ while the welding current I is increased from $I_A$ to $I_B$. The difference between these two welding currents of $\Delta I = I_B - I_A$ represents the detection capability of the arc sensor. Therefore, the larger the welding current $I_B$ when the arc 5 is at the extreme end position B of the bevel, the higher becomes the detection capability of the arc sensor.

Figure 5:
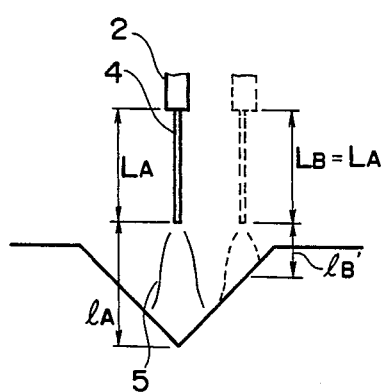
FIG. 5 is a diagrammatic view showing the foremost part of the current carrying tip.

The higher the rotational speed of the arc 5, the larger becomes the welding current $I_B$, with the current IB increasing rapidly at higher than a predetermined rotational speed of the arc 5. With the rotational speed of the arc 5 increasing at an extremely high rate, the protruding length LB of the welding wire 4 is at a constant value approximately equal to the protruding length $L_A$, with only the arc length being reduced to $l_{B'}$ as indicated in FIG. 5, with the arc operating point shifting to point $S_{B'}$ in FIG. 4. Thus the welding current is increased to $I_{B'}$ and the welding current difference $\Delta I$ between the welding current between the current when the arc 5 is at the central position of the bevel and that when the arc 5 is at the extreme lateral position is also increased to elevate the detection capability of the arc sensor.

Figure 6A:
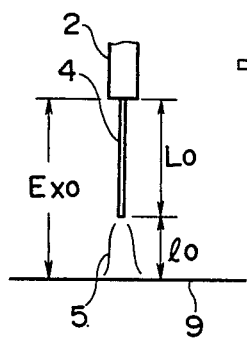
FIGS. 6a, 6b and 6c are diagrammatic views showing changes in the arc length when the distance Ex between the current carrying tip and the base metal is changed.
Figure 6B:
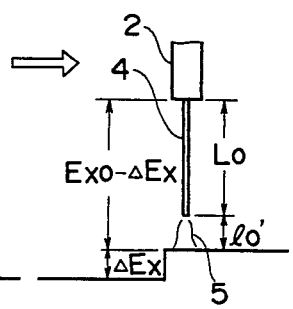
Figure 6C:
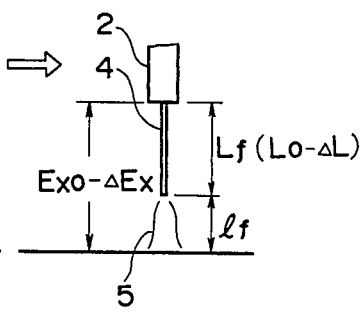
Figure 7:
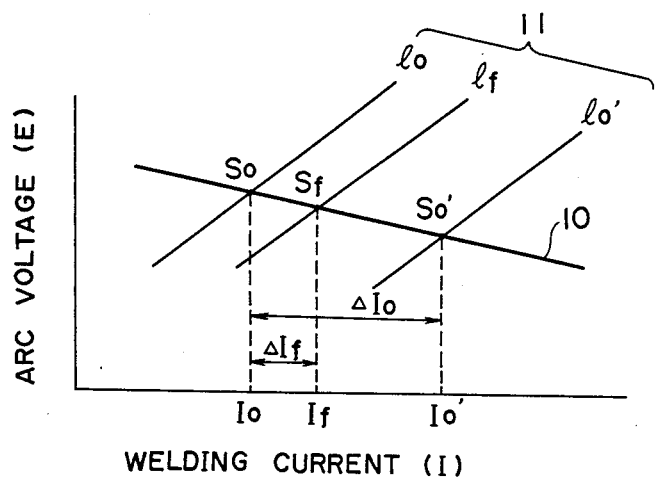
FIG. 7 is a diagram showing changes in the welding current I and the arc voltage E caused by changes in the arc length shown in FIG. 6, with the welding current I and the welding voltage E being taken on the abscissa and on the ordinate, respectively.

An elevated rotational speed of the arc 5 above which the effective welding current difference $\Delta I$ of the arc sensor is achieved, is now explained by referring to FIGS. 6 and 7. FIGS. 6a to 6c are diagrammatic views for explaining the case in which the distance Ex between the electrode tip 2 and the base metal 9 is momentarily changed and FIG. 7 is a characteristics diagram showing the changes in the welding current I and the arc voltage E when the arc length is changed by changes in the distance Ex. FIG. 6a shows the state in which welding is performed with the distance Ex between the current carrying tip 2 and the base metal 9 equal to Exo, the protruding length of Lo and the arc length of lo, FIG. 6b shows the state in which welding proceeds from the state of FIG. 6a in a direction shown by the arrow such that the distance Exo between the current carrying tip 2 and the base metal 9 has just decreased momentarily by ΔEx, and FIG. 6c shows the steady state which is reached after lapse of sufficient time since the state shown in FIG. 6b.

When the welding proceeds from the state shown in FIG. 6a to that shown in FIG. 6b, the distance Exo between the current carrying tip 2 and the base metal 9 is decreased momentarily by ΔEx, such that the protruding length in the state of FIG. 6b remains equal to that in the state of FIG. 6a, that is, equal to Lo, the arc length being changed from lo to lo′=lo−ΔEx. As the welding proceeds further and the steady state shown in FIG. 6c is reached, the protruding length and the arc length are respectively changed to Lf and lf matched to the distance Exo−ΔEx between the current carrying tip 2 and the base metal 9. The arc length at this time is under the relationship of lo>lf>lo′ and the welding current in the states of FIG. 6a, 6b and 6c may be found by the operating points So, So′ and Sf or the points of intersection of the external characteristic curve 10 of the welding electric source and the load characteristic curves 11 of the arcs corresponding to the respective arc lengths lo, lo′ and lf, as shown in FIG. 7. Therefore, when the welding proceeds from the state of FIG. 6a to the state of FIG. 6b, the welding current is changed from Io to Io′, as shown in FIG. 7, and further changed to If when the steady state shown in FIG. 6c is reached.

On the other hand, in the case of welding with a consumable electrode, the wire fusing or melting speed $M_R$ is given in a well-known manner by the following formula as a function of the welding current I and the protruding length L of the welding wire 4

$$M_R = AI + BL \cdot I^2 \tag{1}$$

wherein A and B denote constants determined by factors such as the material and diameter of the welding wire 4 and the arc atmosphere.

On the other hand, the rate of change of the protruding length L or dL/dt is given by the difference between the wire supply speed Vf and the wire melting speed $M_R$, as indicated by the formula (2)

$$\frac{dL}{dt} = Vf - M_R \tag{2}$$

It is noted that, in case of a welding by a consumable electrode in which an electrical power source having constant voltage characteristics is employed, the wire supply speed Vf remains constant. Therefore, from the welding current Io shown in FIG. 6a, the wire supply speed Vf may be obtained by the formula (3)

$$Vf = AI_o + BL_o \cdot I_o^2 \tag{3}$$

From the protruding length L(t) and the welding current I(t) during the time the welding proceeds from the state of FIG. 6a to that of FIG. 6c, the wire melting speed MR is given by $$M_R = AI(t) + BL(t)I^2(t) \tag{4}$$

If we put $$I(t) = I_o + \Delta I \tag{5}$$

$$L(t) = L_o - \Delta L \tag{6}$$

and substitute the equations (3) to (6) into equation (2), while omitting the terms of the second order of ΔI and ΔL, the equation (2) is expressed by the following formula (7)

$$\frac{dL(t)}{dt} = -(A + 2BL_oI_o)\Delta I + BI_o^2 \Delta L = \tag{7}$$

$$-(A + 2BL_oI_o)\{I(t) - I_o\} + BI_o^2\{L_o - L(t)\}$$

The external characteristic curve 10 of the welding electrical source and the arc length-arc voltage curve may be approximated by straight lines for small values of ΔEx shown in FIG. 6, for example, for ΔEx not larger than about 10 mm. Therefore, with the gradient of the characteristic curve 10 of the welding electrical source being set to k(V/A) and with the gradient of the arc length-arc voltage curve, that is, the arc potential gradient, being set to K(V/mm), and taking the instant that the distance between the current carrying tip and the metal base has changed by ΔEx as the time reference (t=o), the change in the arc voltage after the lapse of time t is found from $$E_o - E = k\{I(t) - I_o\} = K\{\Delta Ex - L_o + L(t)\} \tag{8}$$

Therefore, we obtain $$I(t) - I_o = \frac{K}{k}\{L(t) + \Delta Ex - L_o\} \tag{9}$$

Substituting the equation (9) into the equation (7) and putting the equation into order, we obtain $$\frac{dL(t)}{dt} = -\left\{\frac{K}{k}(A + 2BL_oI_o) + BI_o^2\right\}L(t) \tag{10}$$

$$+ BL_o I_o^2 - \frac{K}{k}(A + 2BL_oI_o)(\Delta Ex - L_o)$$

If we assume $$\alpha = \frac{K}{k}(A + 2BL_oI_o) + BI_o^2, \text{ and} \tag{11}$$

$$\beta = BL_oI_o^2 - \frac{K}{k}(A + 2BL_oI_o)(\Delta Ex - L_o)$$

the equation (10) may be expressed by the formula $$\frac{dL(t)}{dt} = \alpha L(t) = \beta \tag{12}$$

Setting the integration constant equal to $C_1$ and solving the equation (12), $$L(t) = \frac{\beta}{\alpha} + C_1 e^{-\alpha t} \tag{13}$$

If we assume t=o and t=∞ in the equation (13), the protruding length Lo for the state of FIG. 6b and the protruding length Lf for the state of FIG. 6c may be expressed as $$L_o = \frac{\beta}{\alpha} + C_1 \tag{14}$$

-continued $$Lf = \frac{\beta}{\alpha}$$

so that the following equation $$L(t) = Lf + (Lo - Lf)e^{-\alpha t} \qquad (15)$$

is obtained from the equations (13) and (14).

On the other hand, if we apply the equation (7) to the steady state of FIG. 6c, since the rate of change of the protruding length or $dL/dt$ is zero in the steady state, the following equation (16)

$$(A + 2BLoIo) = BIo^2 \frac{\Delta Lf}{\Delta IV} \qquad (16)$$

is obtained. Substituting the equation (16) into $\alpha$ of the equation (11), the time constant $\tau$ of the change in the wire melting speed is given by the following formula (17)

$$\begin{aligned} \tau &= \frac{1}{\alpha} t \frac{1}{BI_o^2} \left(1 - \frac{Lo - Lf}{\Delta Ex}\right) \\ &= \frac{1}{BI_o^2} \left(1 - \frac{\Delta Lf}{\Delta Ex}\right) \end{aligned} \qquad (17)$$

Figure 8:
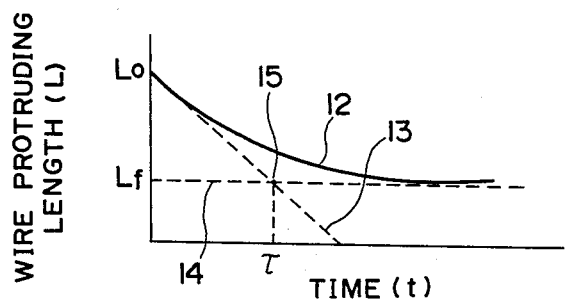
FIG. 8 is a diagram showing changes in the wire protruding length, with time t and the wire protruding length L being taken on the abscissa and the ordinate, respectively.
Figure 9:
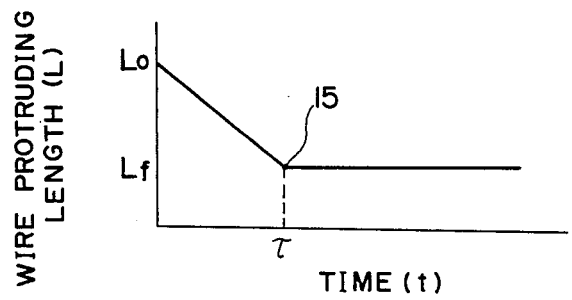
FIG. 9 is a diagram showing changes in the wire protruding length L, with time t and the wire protruding length L being taken on the abscissa and on the ordinate, respectively.

The change in the protruding length $L(t)$ given by the formula (15) is shown by a curve 12 in FIG. 8, by taking the protruding length $L(t)$ on the ordinate and time t on the abscissa. Referring to FIG. 8, the time constant $\tau$ shown in the equation (17) is the value of the time t at the point of intersection 15 between a tangent 13 of a curve 12 at time $t=0$ and a straight line 14 of the protruding length $L(t)=Lf$. By approximation, the protruding length $L(t)$ may safely be assumed to attain the ultimate steady-state value Lf at $t=\tau$ as shown in FIG. 9.

Thus, when the time t during which the arc 5 shifts from the position at the center 8 of the bevel A to the extreme lateral position B of the bevel offset from the center of the bevel 8 in FIGS. 2 and 3 is less than the time constant $\tau$, the wire protruding length $L_B$ at the extreme lateral position of the bevel B approaches the protruding length $L_A$ at the center of the bevel A, with increase in the rotational speed of the arc 5, as shown in FIG. 5.

Therefore, the operating point $S_B$ of the arc 5 shown in FIG. 4 approaches the operating point $S'_B$ and the change in the welding current $\Delta I$ can be set to a larger value so that it becomes possible to elevate the detection capability of the arc sensor.

Since the time T during which the arc 5 makes one complete revolution is four times the time during which the arc 5 is moved from the center of the bevel A to the extreme lateral position B, the speed of rotation $N(Hz)$ is given by $N = 1/(4\tau)$. Therefore, the lower limit of the rotational speed N of the arc for the effect as the arc sensor to be exhibited satisfactorily is given by $1/4\tau$. Since the time constant $\tau$ is given by the formula (17), the detection capability of the arc sensor may be exhibited if the condition $$N > \frac{BI_o^2}{4(1 - \Delta Lf/\Delta Ex)} \qquad (18)$$

is satisfied.

As regards the control accuracy, the higher the rotational speed N, the shorter the time necessary for the arc to make one complete revolution, which time is required for position detection, so that it becomes possible to increase the control accuracy.

The present invention will be explained further by taking a numerical example of the rotational speed N for actual welding.

Table 1 shows the measured results of the changes in the welding current I and the wire protruding length L caused by the change in the distance Ex between the current carrying tip 2 and the base metal, for the case in which the welding is performed with a wire diameter of 1.2 mm and a wire supply speed of 8.7 m/min, using 10% $CO_2$-Ar as the shield gas.

TABLE I

| Ex (mm) | I (A) | L (mm) |
|---------|-------|--------|
| 20.0 | 285 | 15.0 |
| 18.0 | 295 | 13.2 |

Thus, we obtain $$\frac{\Delta L_T}{\Delta Ex} = \frac{1.8}{2.0} = 0.9$$

Since the value of B in the equation (17) is approximately $5 \times 10^{-5}$ the time constant $\tau$ is given by $$\begin{aligned} \tau &= \frac{1}{BI_o^2}\left(1 - \frac{\Delta Lf}{\Delta Ex}\right) \\ &= \frac{1}{5 \times 10^{-5} \times 285^2}(1 - 0.9) \\ &\approx 25 \text{ (ms)} \end{aligned}$$

and, under this condition, the minimum necessary value Nmin for the rotational speed of the arc N is given by $$N\text{min} = \frac{1}{4\tau} = 10 \text{ (Hz)}$$

Table 2 shows the measured results of the differential current $\Delta I$ between the current when the electrode wire is at the center of the arc A and that when it is at the extreme lateral position B, when the fillet welding was performed by an arc rotating at an elevated speed with the diameter of rotation $D=2$ mm and under the welding condition shown in Table 1.

TABLE 2

| Rotational speed N (Hz) | Current difference $\Delta I$ (A) |
|-------------------------|-----------------------------------|
| 1 | 5 |
| 50 | 40 |

It is seen from Table 2 that, when the speed of rotation N is less than Nmin=10 Hz, as when the speed of rotation N is 1 Hz, the current difference $\Delta I$ is so small that the detection capability of the arc sensor is low, whereas, when the rotational speed N is higher than Nmin as when N=50 Hz, the excellent detection capability of the arc sensor may be obtained.

It is also noted that the fluctuations in the welding current due to the noise caused during welding are in the range of 3 to 4 A so that, when the rotational speed N is 1 Hz, the difference between the current difference ΔI and the current fluctuations due to the welding noise is so small for the rotational speed N of 1 Hz that the effect of the noise becomes acute, whereas for the rotational speed N of 50 Hz, the effect of the noise may be reduced to as low as about 1%.

We claim:

1. A method for arc welding in which an electrode wire is rotated to cause an arc to be revolved at an elevated speed, said arc being used as an arc sensor for performing a bevel profiling, comprising the following steps:

calculating the value $\frac{1}{4}\tau$ (Hz), where the time constant of the change in the wire melting speed is given by the following formula:

$$\tau = \frac{1}{BI_o^2}\left(1 - \frac{\Delta L_f}{\Delta E_x}\right),$$

wherein $I_o$ denotes a welding current, B denotes a constant determined by the diameter and material of the electrode wire, and $\Delta L_F/\Delta E_x$ denotes a variation in the wire protruding length L in the ultimate steady state with respect to a variation in the distance $E_x$ between the current carrying tip and the base metal, and rotating said arc at a rotational speed N which is greater than $\frac{1}{4}\tau$ (Hz), whereby the difference in the welding current when the electrode wire is at the center of the bevel and that when it is at the extreme lateral position of the bevel is greater than the difference for $N<\frac{1}{4}\tau$.

* * * * *